(12) United States Patent
Ma et al.

(10) Patent No.: US 7,782,417 B2
(45) Date of Patent: Aug. 24, 2010

(54) LIQUID CRYSTAL DISPLAY WITH HOUSING PROVIDING FPCB ACCESS

(75) Inventors: Xiao-Ping Ma, Shenzhen (CN); Wen-Hui Yao, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 690 days.

(21) Appl. No.: 11/584,964

(22) Filed: Oct. 23, 2006

(65) Prior Publication Data

US 2007/0091225 A1 Apr. 26, 2007

(30) Foreign Application Priority Data

Oct. 21, 2005 (TW) .............. 94137003 A

(51) Int. Cl.
*G02F 1/1333* (2006.01)
(52) U.S. Cl. .................................. 349/58
(58) Field of Classification Search .......... 349/58
See application file for complete search history.

(56) References Cited

U.S. PATENT DOCUMENTS

| | | | |
|---|---|---|---|
| 5,946,062 A | 8/1999 | Hasegawa et al. | |
| 6,339,457 B1 | 1/2002 | Won | |
| 6,667,779 B2 * | 12/2003 | Lee | 349/58 |
| 2005/0094054 A1 * | 5/2005 | You et al. | 349/58 |
| 2006/0119760 A1 * | 6/2006 | Okuda | 349/58 |
| 2006/0125981 A1 * | 6/2006 | Okuda | 349/110 |
| 2006/0133018 A1 * | 6/2006 | Okuda | 361/681 |
| 2006/0152664 A1 * | 7/2006 | Nishio et al. | 349/150 |

FOREIGN PATENT DOCUMENTS

JP  3322629 B2  6/2002

* cited by examiner

*Primary Examiner*—Sung H Pak
(74) *Attorney, Agent, or Firm*—Wei Te Chung

(57) ABSTRACT

An exemplary liquid crystal display (LCD) (40) includes an LCD panel (42), a backlight module (41), and a housing assembly. The housing assembly includes a rear housing (48) and a corresponding front housing (46) to secure the LCD panel and the backlight module. The rear housing has a first sidewall (481) with a first hole (482). The front housing has a second sidewall (461) with a second hole (462) aligned with the first hole. A flexible printed circuit board (44) is electrically connected to the LCD and passes through the first and second holes, such that the housing assembly can protect the flexible printed circuit board without reducing the mechanical strength of the housing assembly.

8 Claims, 6 Drawing Sheets

LIQUID CRYSTAL DISPLAY WITH HOUSING PROVIDING FPCB ACCESS

BACKGROUND OF THE INVENTION

1. Field of the Invention

The present invention relates to liquid crystal displays, and in particular to a liquid crystal display having a housing with a through hole for providing access for an external wiring connection.

2. General Background

Liquid crystal displays (LCDs) are one of the most popular flat displays because of their thin profile and low power consumption. In order to achieve the thin profile requirements of products such as notebook computers, conventional LCD modules utilized in notebook computers are generally assembled by side fastening means. This further reduces the thickness of the LCD.

FIG. 5 is an exploded, isometric view of a conventional LCD 10. The LCD 10 includes a backlight module 11, an LCD panel 12, and a housing assembly. The housing assembly includes a front housing 18 and a rear housing 16. The rear housing 18 has first sidewalls 181 with a plurality of lugs 183, and the front housing 16 has second sidewalls 161 with a plurality of lug holes 163 corresponding to the lugs 183.

FIG. 6 shows the LCD 10 fully assembled. In FIGS. 5 and 6, a flexible printed circuit board (FPCB) 14 is provided. The FPCB 14 is electrically connected to the LCD panel 12. When assembling the LCD 10, the backlight module 11 and the LCD panel 12 are sequentially disposed onto the enclosed area of the rear housing 18, and the FPCB 14 extends out of the enclosed area. Next, the front housing 16 is attached to the rear housing 18, thereby receiving and securing the LCD panel 12 and the backlight module 11 inside a housing assembly. The FPCB 14 extends outward between the first sidewall 181 of the rear housing 18 and the second sidewall 161 of the front housing 16, for signal communication with another control board (not shown) of the LCD 10.

FIG. 7 shows a partial cross-section of the LCD 10. It can be seen that there is a gap larger than the thickness of the FPCB 14 between the first sidewall 181 of the rear housing 18 and the second sidewall 161 of the front housing 16, to protect the FPCB 14 from being folded or damaged. This arrangement, however, means that the lugs 183 of the first sidewall 181 and the lug holes 163 of the second sidewall 161 do not necessarily match precisely. That is, the rear housing 16 may shift slightly in a horizontal direction, and the LCD panel 12 and the backlight module 11 may not be firmly secured in the housing assembly.

FIG. 8 is a partial cross-sectional view of another conventional LCD 20. The differences between the LCD 20 and the above-described LCD 10 are that in the LCD 20, a second sidewall 261 of a front housing 26 has a notch 262. As seen, the notch 262 is higher than a first sidewall 281 of a rear housing 28 by a predetermined distance D1, thereby forming an opening when the front housing 26 is attached on the rear housing 28. An FPCB 24 connected to an LCD panel 22 for external signal communication is directly extended out of this housing assembly through the notch 262. Therefore, there is no need for a gap between the rear housing 28 and the front housing 26, and the rear housing 28 and the front housing 26 can be firmly engaged with each other.

According to the above structure, the notch 262 of the front housing 26 must be higher than the first sidewall 281 of the rear housing 28. This means the notch 262 may be unduly large and reduce the mechanical strength of the front housing 26. Further, the front housing 26 is liable to be deformed during fabrication or assembly. Hence, there is a need a housing assembly for an LCD which overcomes these problems.

SUMMARY

Embodiments of the invention provide a liquid crystal display (LCD) having an improved housing assembly.

One embodiment of the invention provides an LCD including an LCD panel, a backlight module and a housing assembly. The housing assembly includes a front housing and a corresponding rear housing to secure the LCD panel and the backlight module. The rear housing has a first sidewall with a first hole. The front housing has a second sidewall with a second hole aligned with the first hole. A flexible printed circuit board is electrically connected to the LCD and directly passes through the first and second holes for external signal communication.

The second sidewall of the rear housing has a plurality of lugs, and the first sidewall of the front housing has a plurality of lug holes or recesses engagingly receiving the lugs. The backlight module is disposed between the rear housing and the LCD panel. The first and the second hole are generally rectangular with fillets at each corner and overlapped, or partially overlap, with each other, forming a through hole portion for the FPCB connecting to other control modules.

Another embodiment of the invention provides another approach. A housing assembly of an LCD includes a front housing and a corresponding rear housing to secure an LCD panel and a backlight module of the LCD. Each front and rear housings of the housing assembly has a notches aligned with each other and overlapped, thereby cooperatively forming an opening, such that a flexible printed circuit board electrically connected to the LCD for external signal communication can directly extending through the opening without being damaged.

A detailed description of various embodiments is given below with reference to the accompanying drawings.

BRIEF DESCRIPTION OF THE DRAWINGS

Embodiments of the invention can be more fully understood by reading the subsequent detailed description and examples with references made to the accompanying drawings, wherein.

DETAILED DESCRIPTION OF EMBODIMENTS

Figure 1:
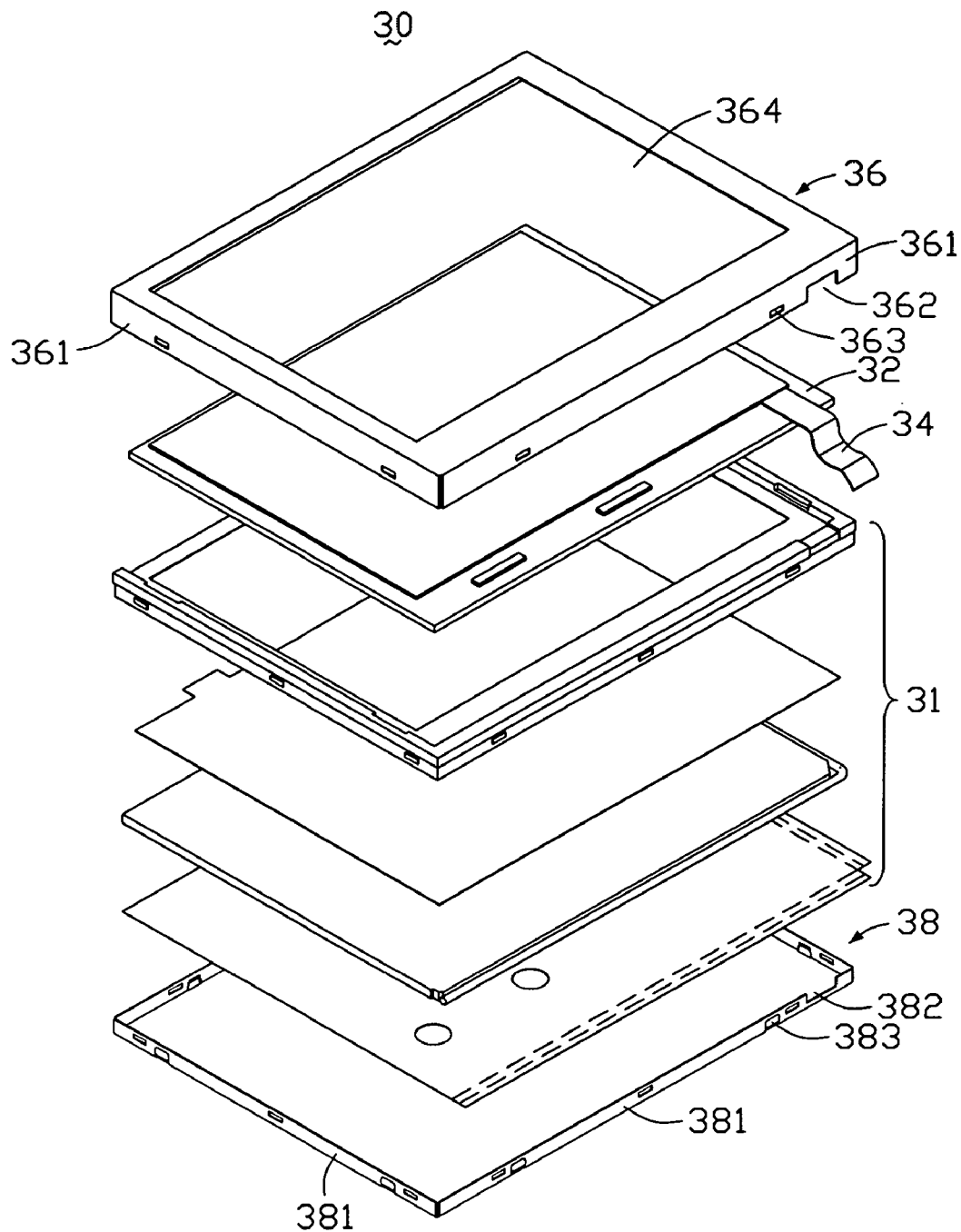
FIG. 1 is an exploded, isometric view of an LCD in accordance with a first embodiment of the present invention.

FIG. 1 is an exploded, isometric view of an LCD 30 in accordance with a first embodiment of the present invention. The LCD 30 includes an LCD panel 32, a backlight module 31, and a housing assembly. The housing assembly includes a front housing 36 and a corresponding rear housing 38 to secure the LCD panel 32 and the backlight module 31. The rear housing 38 has second sidewalls 381 with a plurality of lugs 383, and the front housing 36 has first sidewalls 361 with a plurality of lug holes 363 corresponding to the lugs 383. In an alternative embodiment, the lug holes 363 may instead be lug holes. One of the first sidewalls 361 of the front housing 36 has a rectangular first notch 362, and one of the second sidewalls 381 of the rear housing 38 has a corresponding rectangular second notch 382. The first and second notches 362, 382 partially overlap when the front and rear housings 36, 38 are attached together.

Figure 2:
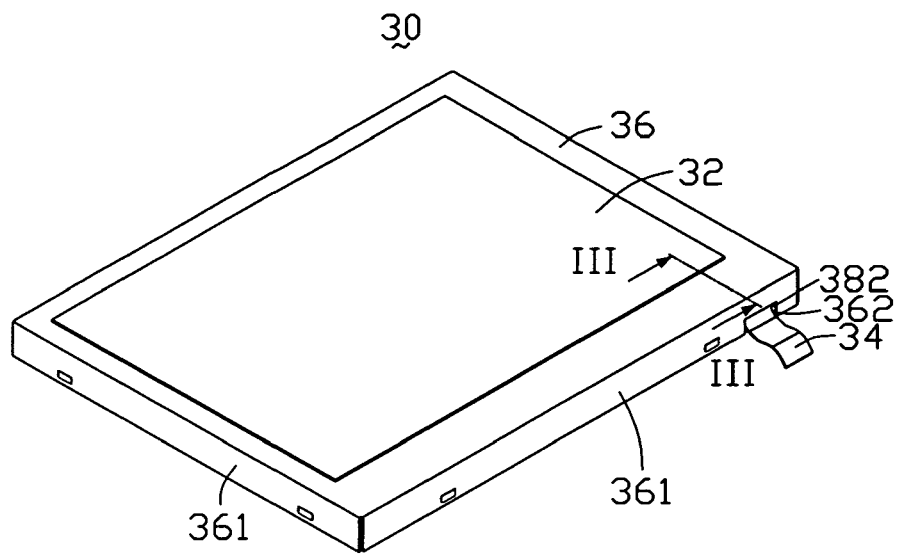
FIG. 2 is an assembled view of the LCD shown in FIG. 1.

FIG. 2 shows the LCD 30 fully assembled. An FPCB 34 is provided and electrically connected to the LCD panel 32. When assembling the LCD 30, the backlight module 31 and the LCD panel 32 are sequentially disposed onto an enclosed area of the rear housing 38, with the FPCB 34 extending out of the enclosed area and passing through the second notch 382 of the rear housing 38. Next, the front housing 36 is attached to the rear housing 38, with the first notch 362 aligned with the second notch 382. In particular, the lugs 383 are engagingly received in the lug holes 363. Thus the LCD panel 32 and the backlight module 31 are received and secured in the housing assembly.

Figure 3:
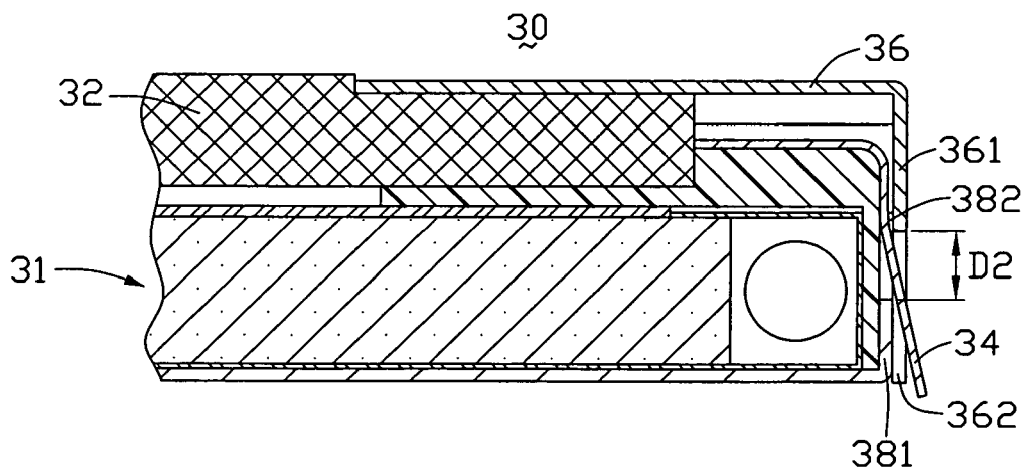
FIG. 3 is a cross-sectional view taken along line 'III-III' of FIG. 2.

FIG. 3 shows a partial cross-section of the LCD 30. It can be seen that when the front and rear housings 36, 38 are attached together, the first notch 362 and the second notch 382 are partially overlapped, thereby forming an opening with a gap distance D2. Generally, D2 is larger than a thickness of the FPCB 34. Typically, D2 is larger than 1.3 mm, to reduce any difficulty in assembly.

Unlike in conventional LCDs, the first and second notches 362, 382 of the LCD 30 have an overlapped region, thereby forming an opening for the passage of the FPCB 34 therethrough when the front and rear housings 36, 38 are attached together. There is no need to provide a predetermined gap between the first and second sidewalls 361, 381 of the housing assembly for the FPCB 34. Therefore the housing assembly can be more precisely assembled and mechanically stable. Each of the first and second notches 362 and 382 need not be unduly large, such that the mechanical strength of the assembled front and rear housings 36, 38 is sound. Furthermore, the first sidewall 361 can have four fillets at four corners thereof that bound the first notch 362, and the second sidewall 381 can have four fillets at four corners thereof that bound the second notch 361. The fillets can help prevent the FPCB 34 from sustaining damage.

Figure 4:
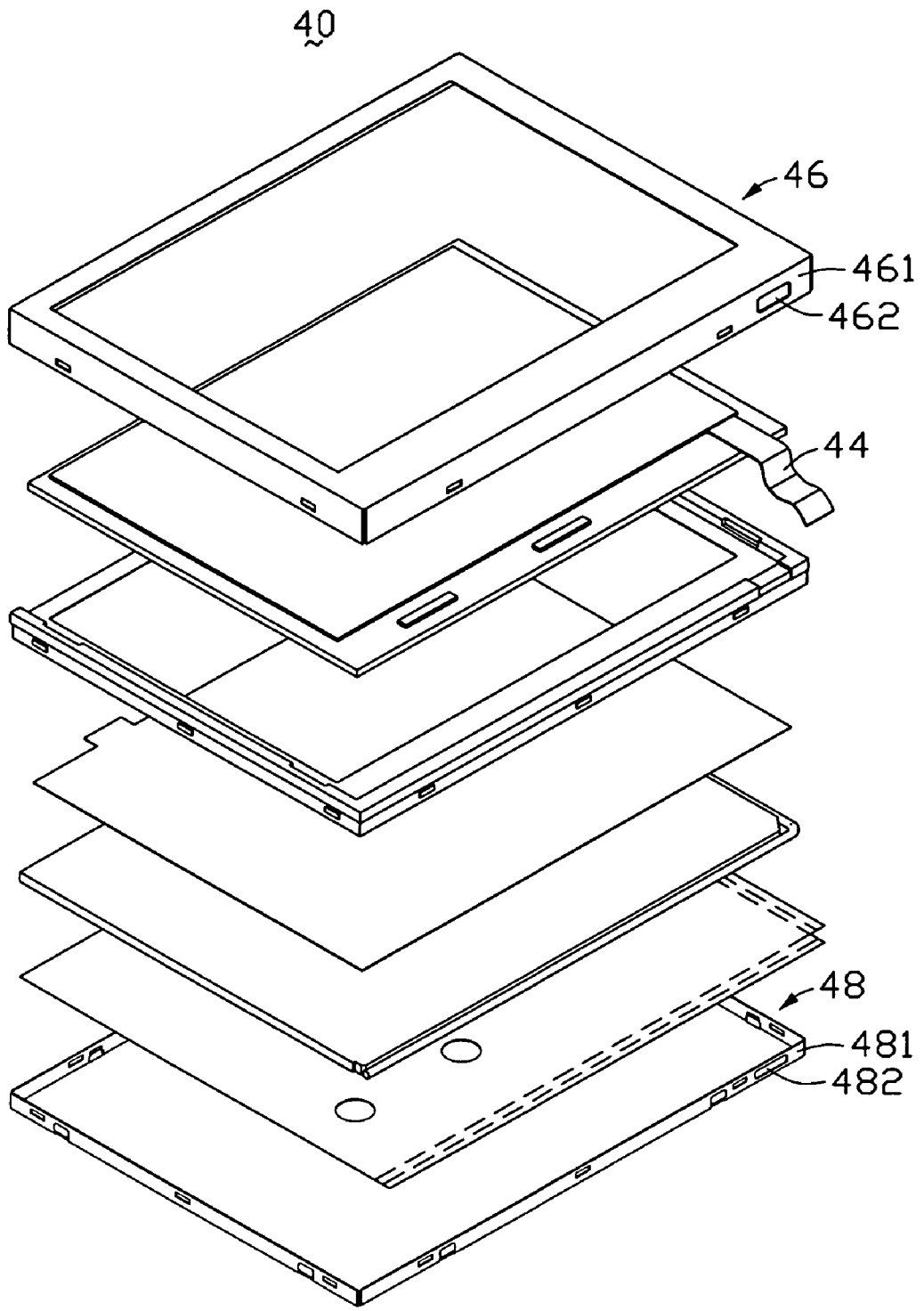
FIG. 4 is an exploded, isometric view of an LCD in accordance with a second embodiment of the present invention.
Figure 5:
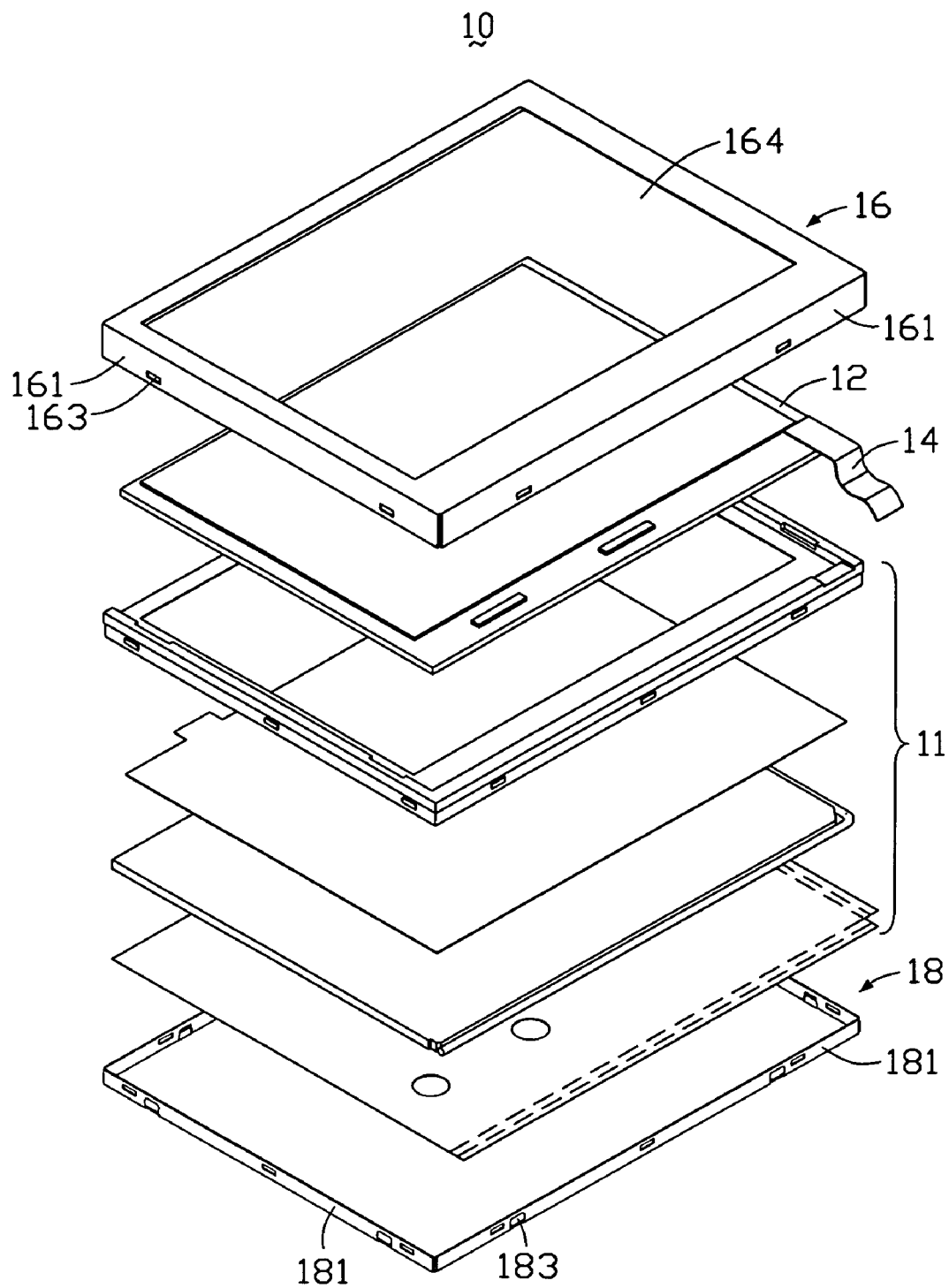
FIG. 5 is an exploded, isometric view of a conventional LCD.
Figure 6:
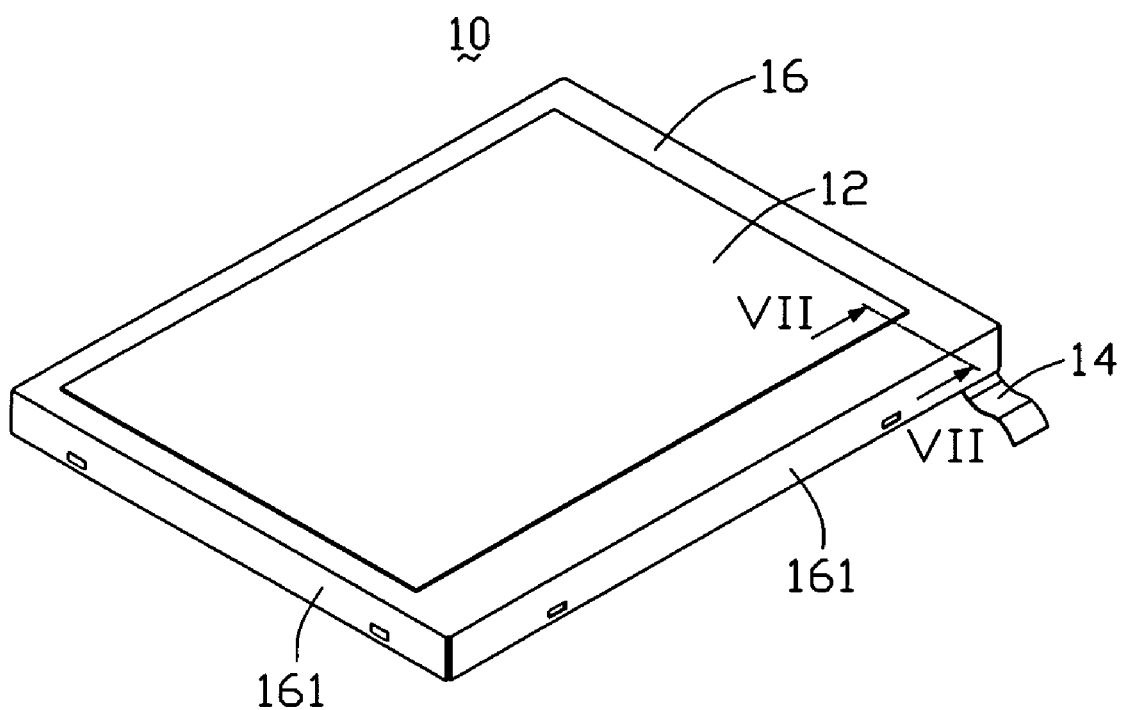
FIG. 6 is an assembled view of the LCD shown in FIG. 5.
Figure 7:
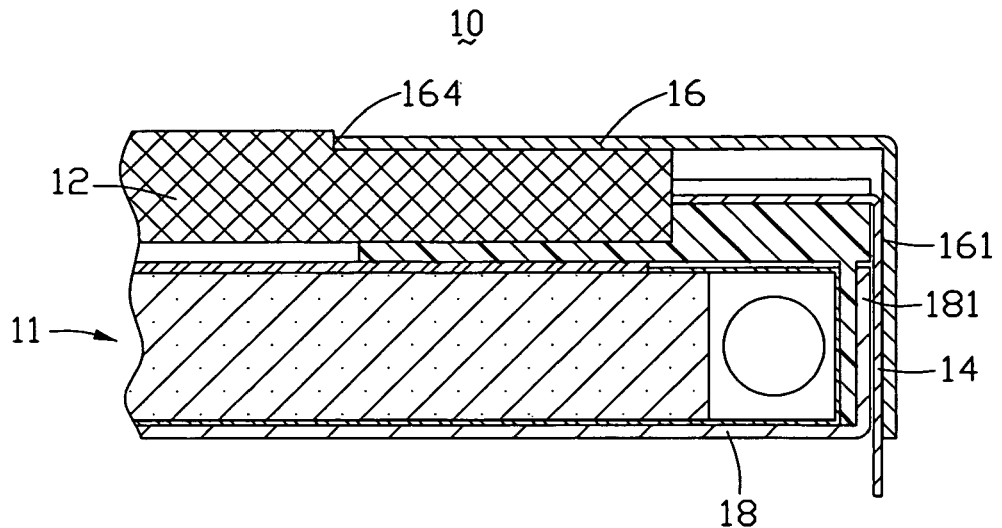
FIG. 7 is a cross-sectional view taken along line 'VII-VII' of FIG. 6.
Figure 8:
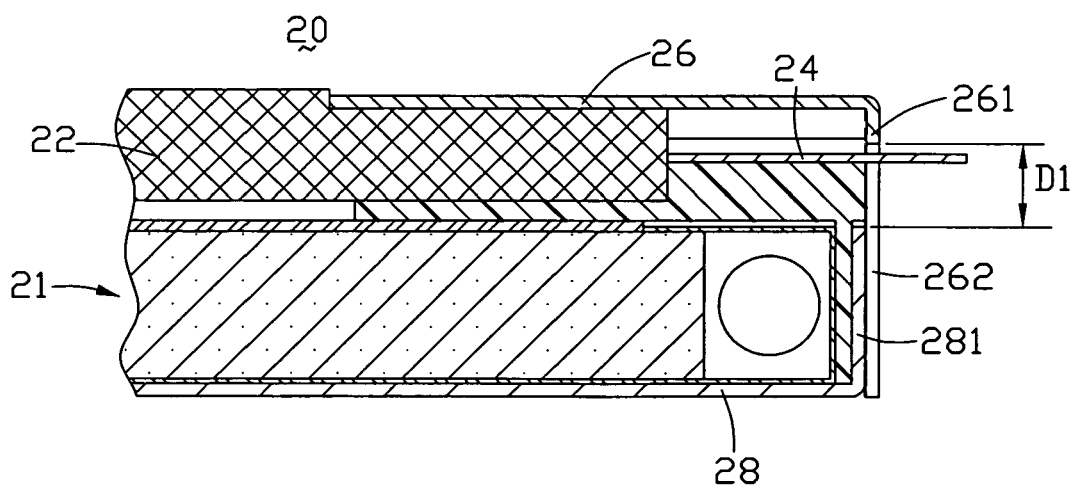
FIG. 8 is similar to FIG. 7, but showing a corresponding view in respect of conventional LCD.

FIG. 4 is an exploded, isometric view of an LCD 40 in accordance with a second embodiment of the present invention. The difference between the LCD 40 and the above-described LCD 30 is that the LCD 40 includes a front housing 46 having a first sidewall 461 with a first hole 462, and a rear housing 48 having a second sidewall 481 with a second hole 482. The first hole 462 and the second hole 482 are rectangular, and are completely surrounded by portions of the first sidewall 461 and the second sidewall 481 respectively. The first hole 462 and the second hole 482 each have fillets at each of four corners thereof. When the front housing 46 is attached to the rear housing 48, the first and second holes 462, 482 overlap or partially overlap, thereby forming a through hole for the passage of an FPCB 44 therethrough.

In alternative embodiments, the lugs and lug holes (or recesses) are not limited to being located on the front and rear housings as described above and shown in the drawings. For example, lugs may be provided on the front housing, and lug holes (or recesses) may be provided on the rear housing. Some LCDs may require a plurality of FPCBs, and the housing assemblies can be configured to have corresponding openings or though holes for the passage of the FPCBs therethrough. The shape of the opening or through hole is not limited to being rectangular. For example, the opening or through hole may be trapezoidal, elliptical, oval-shaped, circular, etc.

While the above description has been by way of examples and in terms of preferred embodiments, it is to be understood that the invention is not limited thereto. To the contrary, the above description is intended to cover various modifications and similar arrangements (as would be apparent to those skilled in the art). Therefore, the scope of the appended claims should be accorded the broadest interpretation so as to encompass all such modifications and similar arrangements.

We claim:

1. A liquid crystal display, comprising:
    a liquid crystal display panel;
    a front housing and a rear housing cooperatively receiving and securing the display panel, wherein the front housing has a first sidewall with a first hole, and the rear housing has a second sidewall with a second hole aligned with the first hole, the first hole and the second hole overlapping to define an opening, the opening having a smaller size than the first hole and the second hole; and
    a flexible printed circuit board electrically connected to the display panel and extending through the opening.

2. The liquid crystal display as claimed in claim 1, wherein the first hole and the second hole are generally rectangular.

3. The liquid crystal display as claimed in claim 2, wherein four corners of the first sidewall and the second sidewall that bound each of the first hole and the second hole are formed as fillets.

4. The liquid crystal display as claimed in claim 1, wherein the second sidewall of the rear housing has a plurality of lugs, and the first sidewall of the front housing has a plurality of lug holes or recesses engagingly receiving the lugs.

5. The liquid crystal display as claimed in claim 1, further comprising a backlight module disposed between the rear housing and the display panel.

6. A liquid crystal display, comprising:
    a liquid crystal display panel;
    a front housing and a rear housing cooperatively receiving and securing the display panel, wherein the front housing has a first sidewall with a first notch, and the rear housing has a second sidewall with a second notch overlapped with the first notch thereby cooperatively forming an opening, the opening having a smaller size than the first notch and the second notch; and
    a flexible printed circuit board electrically connected to the display panel and extending through the opening.

7. A liquid crystal display, comprising:
    a front housing and a rear housing cooperatively receiving and securing a display panel therein, one of said front housing and said rear housing defining an outer sidewall overlapped with an inner sidewall defined by the other of said front housing and said rear housing; and
    a flexible printed circuit board having an inner section, a middle section and an outer section thereof, with the inner section electrically connected to the display panel and extending along a first direction perpendicular to said inner and outer sidewalls; wherein
    the outer sidewall and the inner sidewall define an overlapping opening corresponding to said flexible printed circuit board under a condition that said overlapping opening is lower than the inner section extending along said first direction so as to guide the middle section to extend along a second direction perpendicular to said first direction and inside the outer sidewall in a parallel relation with the outer sidewall, and further guide the outer section to extend through said overlapping opening to an exterior of the liquid crystal display.

8. The liquid crystal display in claim 7, wherein the overlapping opening guides the outer section of the flexible printed circuit board to be deflected from said second direction via the overlapping opening toward the exterior.

* * * * *